US012459663B2

(12) United States Patent
Casteran et al.

(10) Patent No.: US 12,459,663 B2
(45) Date of Patent: Nov. 4, 2025

(54) AIRCRAFT HAVING A DIHYDROGEN TRANSPORT PIPE, AN EMBEDDING CHANNEL FOR SAID TRANSPORT PIPE AND AN AERATION SYSTEM FOR SAID EMBEDDING CHANNEL

(71) Applicant: Airbus Operations SAS, Toulouse (FR)

(72) Inventors: Marc Casteran, Toulouse (FR); Romain Joubert, Toulouse (FR); Jérôme Milliere, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 258 days.

(21) Appl. No.: 18/325,217

(22) Filed: May 30, 2023

(65) Prior Publication Data
US 2023/0382551 A1 Nov. 30, 2023

(30) Foreign Application Priority Data

May 31, 2022 (FR) ...................................... 2205188

(51) Int. Cl.
*B64D 37/32* (2006.01)
*B64D 37/30* (2006.01)
*B64D 37/34* (2006.01)

(52) U.S. Cl.
CPC ............. *B64D 37/32* (2013.01); *B64D 37/30* (2013.01); *B64D 37/34* (2013.01)

(58) Field of Classification Search
CPC ......... B64D 37/30; B64D 37/32; B64D 37/34
See application file for complete search history.

(56) References Cited

U.S. PATENT DOCUMENTS

| 7,302,936 B2 * | 12/2007 | Stolarz ................. F02M 61/166 |
| | | 123/468 |
| 9,939,087 B2 * | 4/2018 | Kolarski ................. F16L 9/125 |
| 10,583,934 B2 * | 3/2020 | Hara .................... B64D 37/005 |
| 2014/0023479 A1 | 1/2014 | Stolte et al. |
| 2016/0114880 A1 | 4/2016 | Reiss et al. |
| 2021/0078702 A1 | 3/2021 | Ciet et al. |

FOREIGN PATENT DOCUMENTS

EP  3012189 A1  4/2016

OTHER PUBLICATIONS

French Search Report for French Patent Application No. 2205188 dated Jan. 5, 2023; priority document.

* cited by examiner

*Primary Examiner* — Nicholas McFall
(74) *Attorney, Agent, or Firm* — Greer, Burns & Crain, Ltd.

(57) ABSTRACT

An aircraft having at least one dihydrogen transport pipe, an embedding channel with a lower gutter, an aeration aperture with an air inlet collecting external air and at least one supply pipe opening at the air inlet, a control unit, and, for one or more lower gutters, a bypass box having, for each lower gutter, an inlet connected to the supply pipe and an outlet connected to the lower gutter, between each associated inlet and outlet, a door able to move alternately between an open position and a closed position, and, for each door, a maneuvering system controlled by the control unit and moving the door.

7 Claims, 6 Drawing Sheets

AIRCRAFT HAVING A DIHYDROGEN TRANSPORT PIPE, AN EMBEDDING CHANNEL FOR SAID TRANSPORT PIPE AND AN AERATION SYSTEM FOR SAID EMBEDDING CHANNEL

CROSS-REFERENCES TO RELATED APPLICATIONS

This application claims the benefit of French Patent Application Number 2205188 filed on May 31, 2022, the entire disclosure of which is incorporated herein by way of reference.

FIELD OF THE INVENTION

The present invention relates to the field of aircraft and, in particular, aircraft of which the energy source is liquid or gaseous dihydrogen, whether this is for supplying a fuel cell or for directly supplying the combustion chamber of an engine. The present invention thus relates to an aircraft having a dihydrogen transport pipe, an embedding channel that allows the passage of the transport pipe and an aeration system for the embedding channel.

BACKGROUND OF THE INVENTION

It is known to use dihydrogen as energy source in an aircraft. The dihydrogen is stored in a reservoir and a transport pipe transports the dihydrogen from the reservoir towards the consuming device, such as for example a fuel cell or the combustion chamber of an engine.

In the event of dihydrogen leaking along this transport pipe, and so as to avoid the creation of a flammable mixture around the leak zone, it is necessary to provide dedicated devices.

It is thus possible to eliminate the presence of the oxidant (the oxygen contained in ambient air) necessary for ignition and to replace it with an inert gas.

It is also possible to ventilate the leak zone in order to limit the proportion of dihydrogen in the mixture and thus remain below the flammability threshold.

When the transport pipe is long, putting such devices in place leads to substantial penalties in the aircraft in terms of mass, cost, energy consumption and physical integration constraints, and makes it necessary to provide systems for monitoring, in real time, the correct operation of each of the devices.

SUMMARY OF THE INVENTION

An object of the present invention is to propose an aircraft having a dihydrogen transport pipe, an embedding channel that allows the passage of the transport pipe and an aeration system for the embedding channel that ensures ventilation of the embedding channel in particular in the event of a dihydrogen leak during the phases of operation of the aircraft.

To that end, an aircraft is proposed, having:
at least one transport pipe in which dihydrogen flows,
for each transport pipe, an embedding channel having a gutter that has a bottom, an opening opposite the bottom, and a perforated intermediate floor between the bottom and the opening that separates the gutter into an upper gutter in which the transport pipe is fastened and a lower gutter,
an aeration system having an aeration aperture arranged to collect air outside the aircraft and at least one supply pipe wherein each one opens at said air inlet via a window,
detection means distributed in each embedding channel and arranged to detect the presence of dihydrogen,
for one or more lower gutters, a bypass box having:
for the or each of said lower gutters, an inlet fluidically connected to the supply pipe and an outlet fluidically connected to said lower gutter, wherein the inlet and the outlet are fluidically connected to one another by a duct, wherein the inlet is different for each lower gutter,
between each associated inlet and outlet, a door able to move alternately between an open position in which the air is free to circulate between the inlet and the outlet and a closed position in which the air is blocked between the inlet and the outlet, and
for each door, a maneuvering system controlled by the control unit and arranged to move said door alternately from the open position to the closed position, and
a control unit arranged to receive information from the detection means and control each maneuvering system on the basis of said information.

With such an arrangement, in the event of dihydrogen leaking into an embedding channel, the dihydrogen is automatically diluted.

Advantageously, each door is mounted so as to be able to move in rotation about a vertical shaft that is central with respect to the door and with respect to the inlet, and the maneuvering system is an electric motor of which the drive shaft is arranged to drive the shaft of the door in rotation.

Advantageously, the bypass box has a recess separated from the ducts by a separation floor, the recess is in fluidic communication with the upper gutters of the gutters connected to said bypass box and the separation floor has passing through it at least one hole fluidically connected between at least one of the ducts and the recess.

Advantageously, the aeration aperture has a flap that is mounted so as to be able to move between a closed position in which it isolates each window from the external air and an open position in which it is stowed so as to allow the external air to pass freely towards each window, and said aircraft has a movement system controlled by the control unit and arranged to move the flap alternately from the open position to the closed position.

Advantageously, the flap is mounted so as to be able to move in rotation at a front part, and the movement system has a plinth, a slider mounted so as to be able to slide on the plinth, a connecting rod of which a first end is fastened in an articulated manner to the slider and of which a second end is fastened in an articulated manner to the flap, and an actuator controlled by the control unit and arranged to move the slider along the plinth.

Advantageously, fans controlled by the control unit are installed in one or more of the supply pipes.

Advantageously, heating means controlled by the control unit are installed in one or more of the supply pipes.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
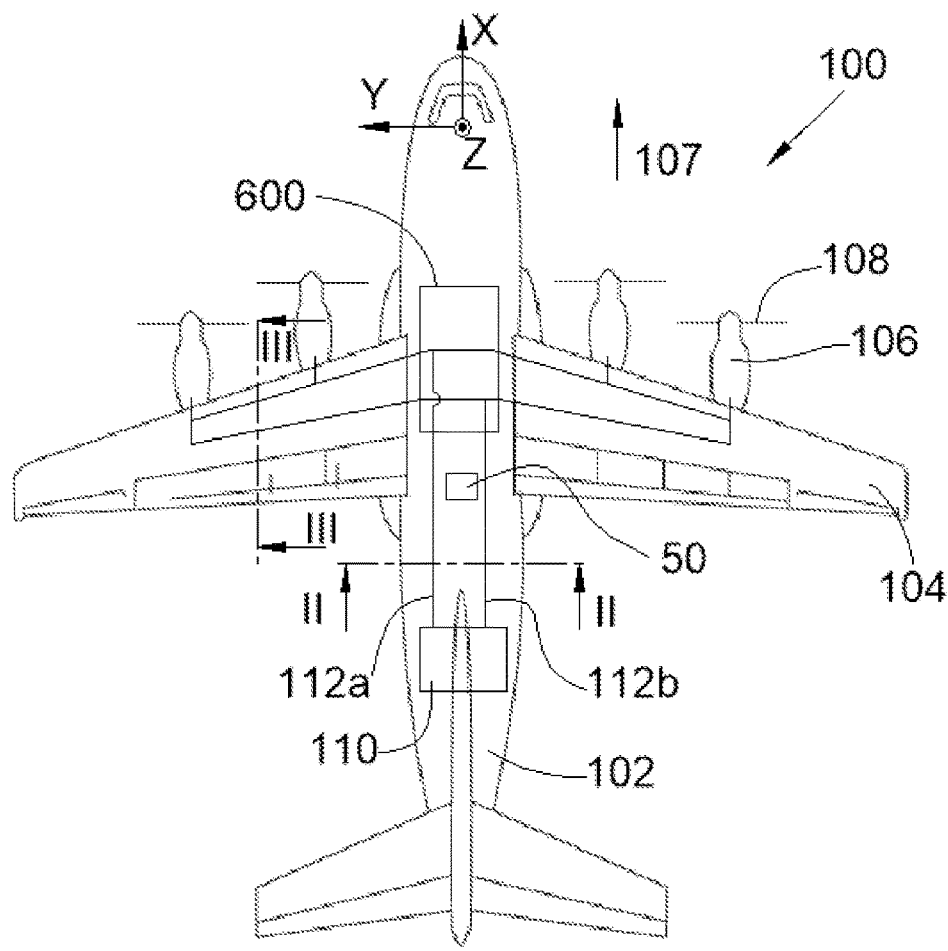
FIG. 1 is a view from above of an aircraft according to the invention.

FIG. 1 shows an aircraft 100 that has a fuselage 102 on either side of which is fastened a wing 104. Beneath each wing 104 is fastened at least one propulsion system 106. By convention, the X direction is the longitudinal direction of the aircraft 100, the Y direction is the transverse direction of the aircraft 100, which is horizontal when the aircraft is on the ground, and the Z direction is the vertical direction or vertical height when the aircraft is on the ground, these three directions X, Y and Z being mutually orthogonal.

Moreover, the terms "front" and "rear" are to be considered relative to a direction of forward movement of the aircraft 100 when the propulsion systems 106 are in operation, this direction being schematically shown by the arrow 107.

In the embodiment of the invention that is presented here, each propulsion system 106 comprises an electric motor, a propeller 108 mounted on the driveshaft of said electric motor and a fuel cell that supplies the motor with electricity.

The fuel cell is supplied with oxygen and dihydrogen in order to produce electricity.

In another embodiment, the propulsion system 106 can take the form of a jet engine of which the fuel that is burnt in the combustion chamber is dihydrogen.

The aircraft 100 also has a dihydrogen reservoir 110 that in this case is disposed in a rear part of the fuselage, but that could be disposed in another part of the aircraft 100. The dihydrogen may be liquid or gaseous.

In order to transport the dihydrogen, the aircraft 100 has at least one transport pipe 112a-b in which the dihydrogen flows. For reasons of ease of implementation, the transport pipes 112a-b are preferentially disposed in the top part of the aircraft 100 and thus extend along the fuselage 102 and the wings 104 in the top part thereof.

In the embodiment of the invention that is presented in FIG. 1, there is a transport pipe 112a that extends between the reservoir 110 and a consuming device (the fuel cell, the jet engine) that consumes the dihydrogen and that transports the dihydrogen from the reservoir 110 towards the consuming device, and there is a transport pipe 112b that extends between the consuming device and the reservoir 110 and that transports the dihydrogen from the consuming device towards the reservoir 110 for example in the case in which the consuming device has not consumed all the dihydrogen provided. However, it is also possible to provide for the two transport pipes to constitute two parallel supply lines that transport the dihydrogen to the motors.

Figure 2:
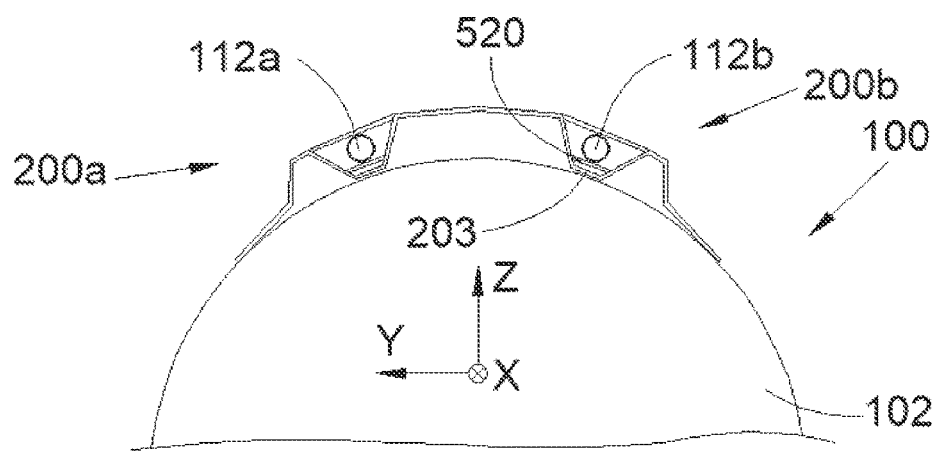
FIG. 2 is a view in cross section of the fuselage of the aircraft in FIG. 1 along the line II-II.
Figure 3:
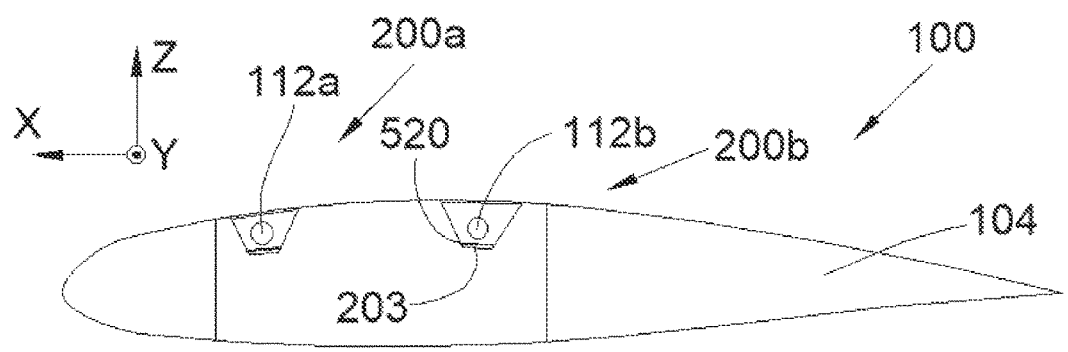
FIG. 3 is a view in cross section of a wing of the aircraft in FIG. 1 along the line III-III.

FIG. 2 shows a cross section of the fuselage 102 with the transport pipes 112a-b and FIG. 3 shows a cross section of a wing 104 with the transport pipes 112a-b.

In the embodiment shown in FIG. 2, the transport pipes 112a-b are housed in a module fastened to the outside of the skin of the fuselage 102, but they could be integrated directly in the fuselage 102 as is the case in FIG. 3 for the transport pipes 112a-b circulating along the wing 104 that are housed in this case in a box of the wing 104. However, the transport pipes 112a-b could also be housed in the leading edge or trailing edge zones since this would be less detrimental in terms of impact on the structure of the box of the wing 104.

Figure 4:
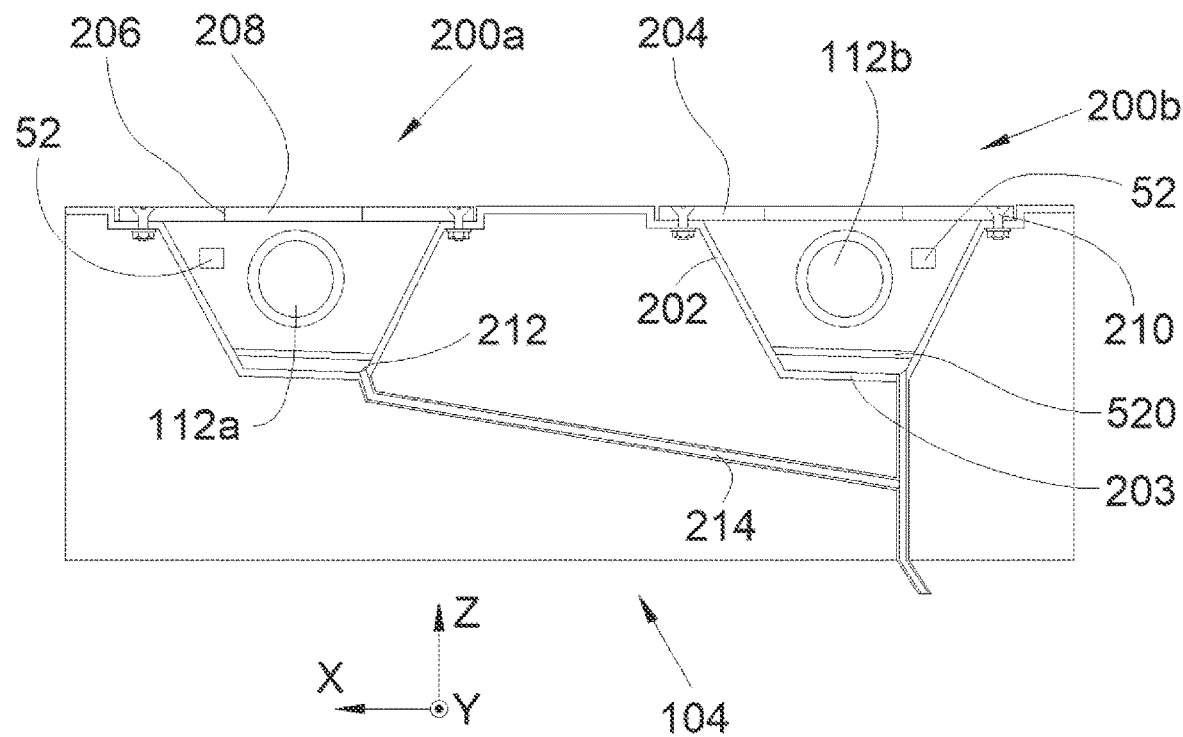
FIG. 4 is an enlarged view of the wing box in FIG. 3.
Figure 5:
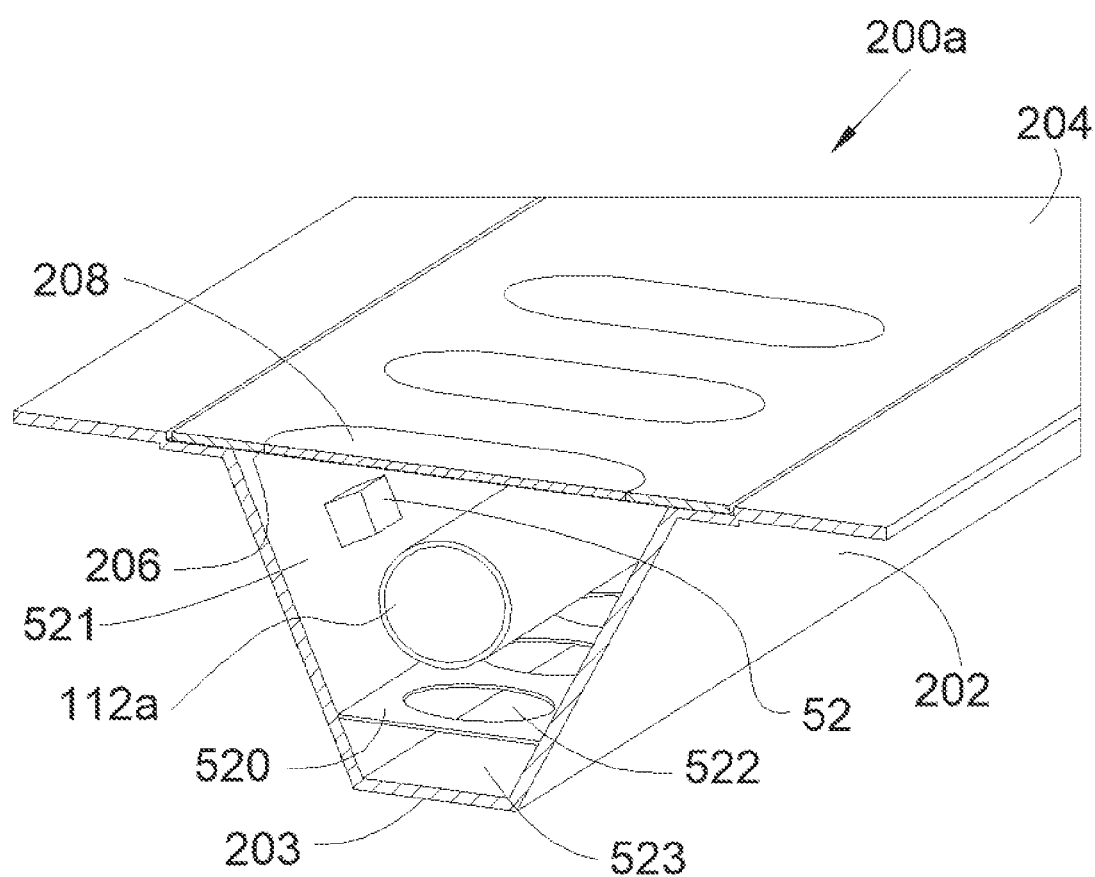
FIG. 5 is a perspective view of an embedding channel according to the invention.

FIG. 4 shows an enlarged view of FIG. 3 but the description that is given below and applies to the wing 104 can also be applied to the fuselage 102, and FIG. 5 shows a perspective view of the embodiment of the invention.

For each transport pipe 112a-b, the aircraft 100 has an embedding channel 200a-b in which said transport pipe 112a-b is housed.

The embedding channel 200a-b has a gutter 202 that has a bottom 203, an opening opposite the bottom 203, and in this case a cover 204 that covers the opening in the gutter 202 by at least partially shutting it off. The transport pipe 112a-b is thus housed between the bottom 203 and the opening and in this case the cover 204. The transport pipe 112a-b is fastened to the gutter 202 by any appropriate means such as for example collars.

In the embodiment of the invention that is presented in FIGS. 2 to 5, the gutter 202 has a trapezoidal section, but sections with a different shape are possible.

The cover 204 constitutes an outer wall of the aircraft 100, i.e. it is in direct contact with external air surrounding the aircraft 100. The cover 204 is fastened to the outer wall of the aircraft 100 by any appropriate fastening means, such as for example in this case bolts 210.

The cover 204 has ventilation windows 206 passing through it that allow the passage of the dihydrogen, in particular in the event of a leak in the transport pipe 112a-b, towards the outside, which in turn limits the concentration of dihydrogen in the embedding channel 200a-b and the risks linked to the presence of dihydrogen. Preferentially, the cover 204 is in the upper position with respect to the bottom 203, i.e. above it.

With such an arrangement, even in the event of dihydrogen leaking into the embedding channel 200a-b, the dihydrogen is automatically evacuated towards the outside, this being done naturally as a result of the low density of the gaseous dihydrogen and the presence of the ventilation windows 206 in the upper part in the cover 204, without it being necessary to place fans, and a simple and lightweight installation is thus obtained. Thus, in the event of a fire due to the presence of dihydrogen, direct contact with the moving ambient air makes it possible to limit the extent of the fire by blowing out the flames. Furthermore, such an arrangement also makes it possible to confine the flames in the gutter 202 in the event of a fire breaking out, and thus to protect the nearby environment.

Furthermore, placing a single transport pipe 112a-b per embedding channel 200a-b prevents a fire that develops in an embedding channel 200a-b, as the result of a leak in the corresponding transport pipe 112a-b, from damaging the transport pipe 112a-b of the other embedding channel 200a-b.

In order to limit the impact of the ventilation windows 206 on the drag of the aircraft 100 in flight, each ventilation window 206 is closed by a stopper 208 made from a material that is breathable to dihydrogen, i.e. the stopper 208 is impermeable to external water that cannot enter the embedding channel 200a-b, and permeable inter alia to dihydrogen that is present in the embedding channel 200a-b and can be evacuated towards the outside. The stopper 208 is for example made from polypropylene or polyethylene.

In order to avoid, in the event of a fire, the fire remaining confined in the embedding channel 200a-b as a result of the presence of the stoppers 208, each stopper 208 is constituted of a material that is liable to break under the effect of heat, such as for example polypropylene or polyethylene. By breaking under the effect of heat, the stopper 208 constitutes a fusible component that makes it possible to open the ventilation window 206 if needed so as to blow out the flames. In particular, the material for the stopper 208 is chosen so as to break when the temperature inside the gutter 202 reaches a value lower than the maximum acceptable temperature for the gutter 202 and the transport pipe 112a-b installed in the gutter 202, i.e. the temperature from which the integrity of the gutter 202 and of the transport pipe 112a-b is no longer guaranteed.

In the event of overpressure, it is also possible to provide that the cover 204 breaks under the effect of the overpressure, thus limiting the risks of breakage of the gutter 202. To this end, the tear resistance of the cover 204 is lower than the tear resistance of the gutter 202, for example through the realization of thinner zones. It is also possible to provide that the breakage takes place at the fastening means of the cover 204, for example by using fusible bolts that break beyond a certain pressure.

In the event of a fire occurring in the gutter 202, and in order to limit the risks of the fire spreading towards the inside of the aircraft 100, the gutter 202 is made from a fire-resistant material and more particularly from a material capable of retaining its mechanical properties even in the event of a fire in the gutter 202. The material is for example titanium, a titanium alloy or a material that has a core that is not fire-resistant but is covered with a fire-resistant protective layer such as rock wool or ceramic.

The gutter 202 has at least one low point 212 at the bottom 203, and this makes it possible to drain the water that might have accumulated in the gutter 202 towards the one or more low points 212. The aircraft 100 then has, for each low point 212, an evacuation pipe 214 of which a first end is fluidically connected to the gutter 202 at the low point 212 and of which a second end opens towards the outside of the aircraft 100 and wherein the evacuation pipe 214 has a descending slope between the first end and the second end so as to evacuate, under the effect of gravity, the water thus collected.

On the ground, the evacuation pipe 214 makes it possible to evacuate the water and in flight, the difference in pressure between the first end and the second end allows additional natural aeration of the embedding channel 200a-b through the ventilation windows 206 and the stoppers 208 when they are present, which are then preferentially breathable.

In order to aerate each embedding channel 200a-b, the aircraft 100 has an aeration system 600 that is disposed in this case at the upper part of the aircraft 100 at the junction of the wings 104 and that makes it possible to introduce external air and to send this air into each embedding channel 200a-b.

In order to avoid the attachments that fasten the transport pipe 112a-b in the embedding channel 200a-b disturbing the flow of the air coming from the aeration system 600, the gutter 202 has an intermediate floor 520 between the bottom 203 and the opening. The intermediate floor 520 is at a distance from the bottom 203 and separates the gutter 202 into an upper gutter 521 in which the transport pipe 112a-b is fastened and a lower gutter 523 in which the air coming from the aeration system 600 circulates. The upper gutter 521 extends between the intermediate floor 520 and the cover 204, the lower gutter 523 extends between the bottom 203 and the intermediate floor 520.

In order to allow the passage of the air from the lower gutter 523 towards the upper gutter 521, the intermediate floor 520 is perforated and in this case has holes 522 passing through it that make it possible to ensure ventilation of the upper gutter 521. In particular, specific zones need to be particularly aerated as a result of the number of elements or connections in this zone, and it is then judicious to dispose these holes 522 in these zones. Such a zone is for example a zone having a large number of transport pipes 112a-b, elbows etc.

Figure 6:
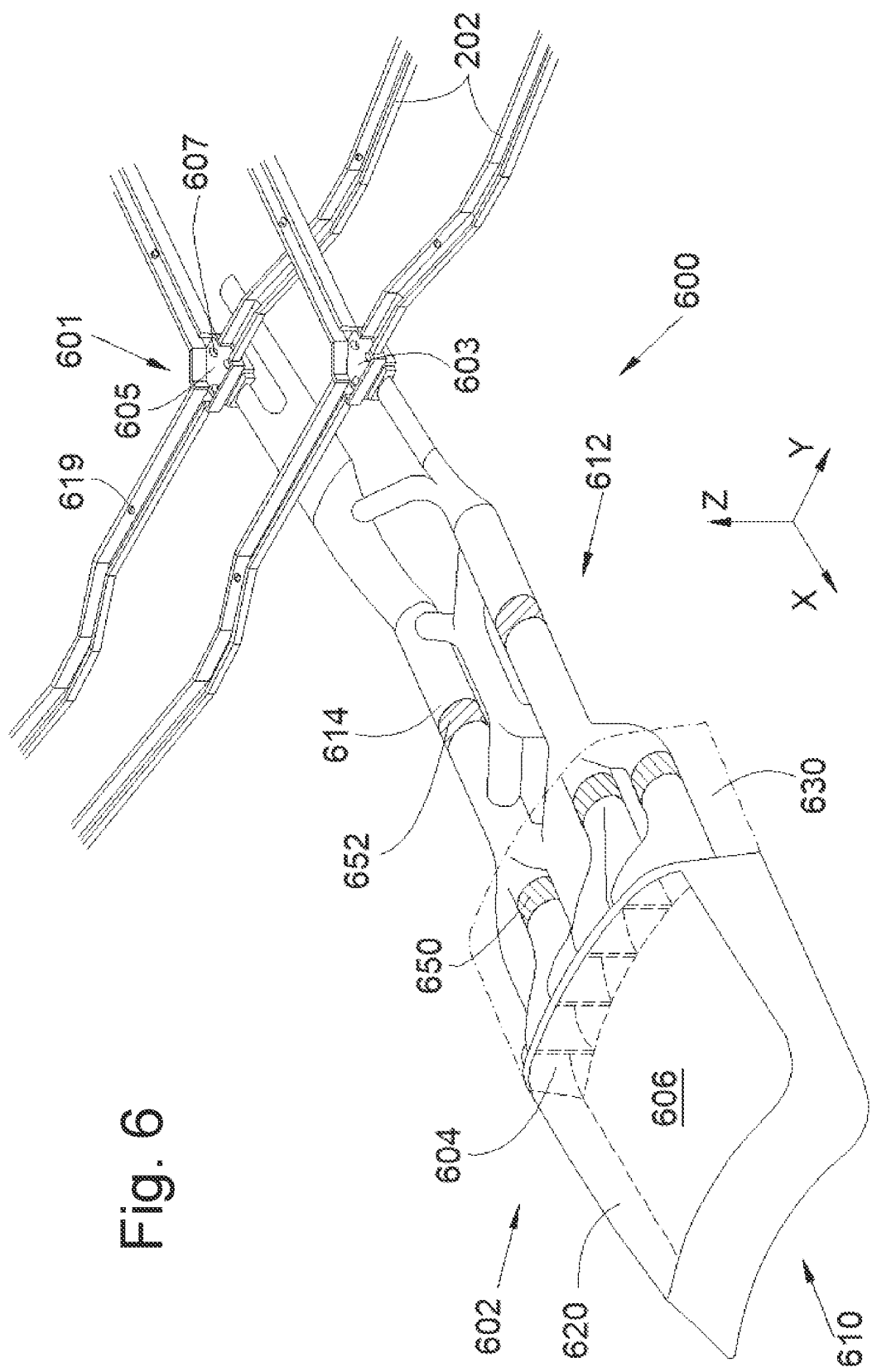
FIG. 6 is a perspective view of embedding channels and of an aeration system according to the invention.

FIG. 6 shows the aeration system 600 according to the invention with the gutters 202, but without the transport pipes 112a-b that are housed in said gutters 202.

The aeration system 600 has an aeration aperture 610 arranged to collect air outside the aircraft 100 and at least one supply pipe 614 fluidically connected to the aeration aperture 610.

In the embodiment of the invention that is presented in FIG. 6, there is a plurality of supply pipes 614 grouped into a supply network 612, and each supply pipe 614 channels the air drawn from outside at the aeration aperture 610 towards one or more lower gutters 523 of the gutters 202.

Figure 7:
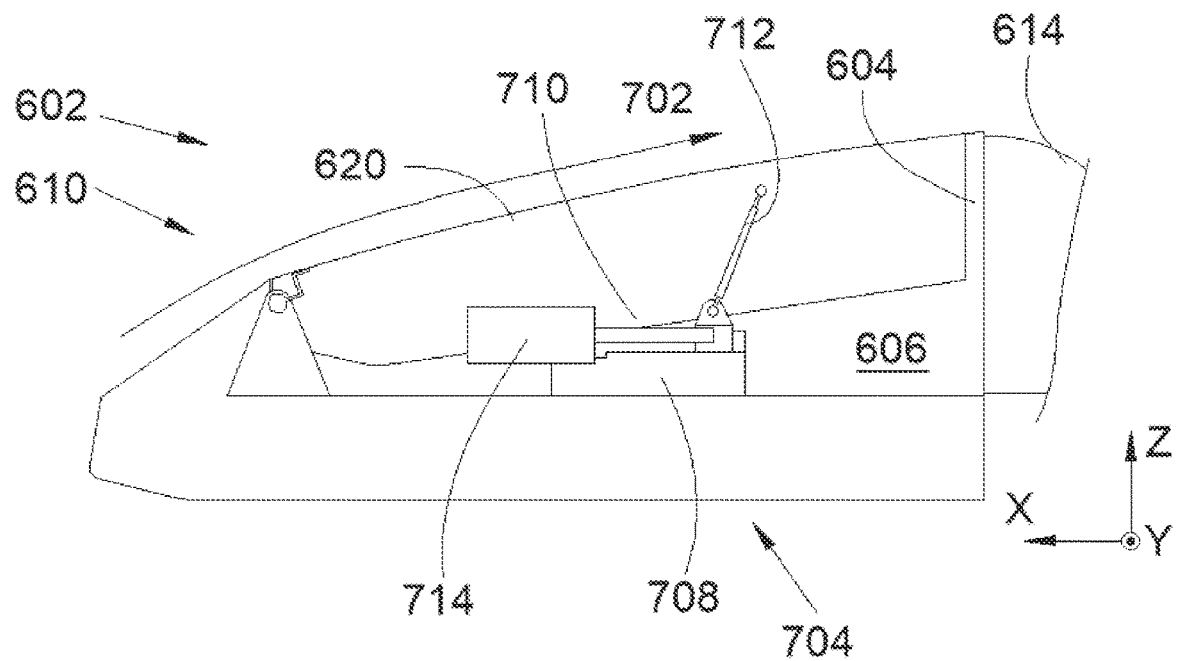
FIG. 7 is a side view in cross section of an aeration aperture of the aeration system according to the invention in the closed position.
Figure 8:
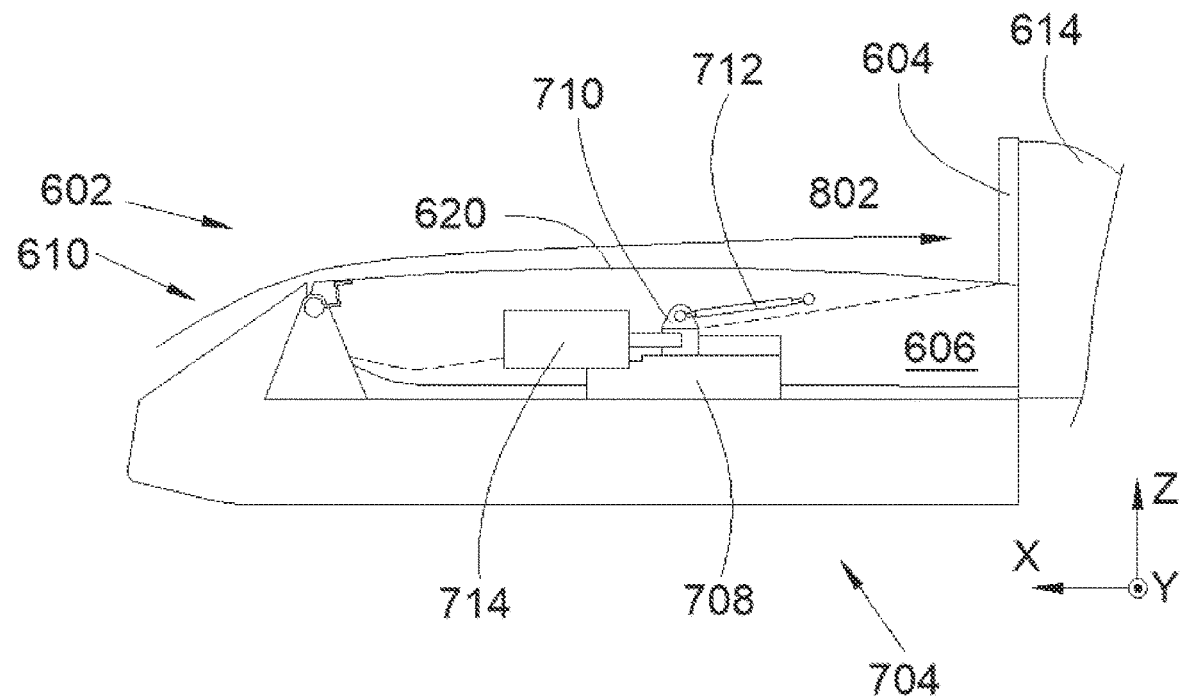
FIG. 8 is a view similar to FIG. 7 in the open position.

In the embodiment of the invention that is presented here, the aeration aperture 610 can alternately adopt a closed position, in FIG. 7, and an open position, in FIG. 8.

An outer skin 630 shown here in part (in dash-dotted line) covers the gutters 202 and the supply network 612 and constitutes the cover 204. This outer skin 630 may be a skin of the aircraft 100 or an additional skin fastened to the skin of the aircraft 100. This outer skin 630 ensures an aerodynamic surface that limits energy consumption.

The aeration aperture 610 has an air inlet 602 created in the outer skin 603, at which each supply pipe 614 opens via a window 604 that is open towards the front of the aircraft 100 in order to collect external air when the aircraft 100 is moving forwards or is stopped.

For one or more lower gutters 523, the aircraft 100 has a bypass box 601, i.e. at each intersection between a supply pipe 614 and one or more lower gutters 523.

Figure 9:
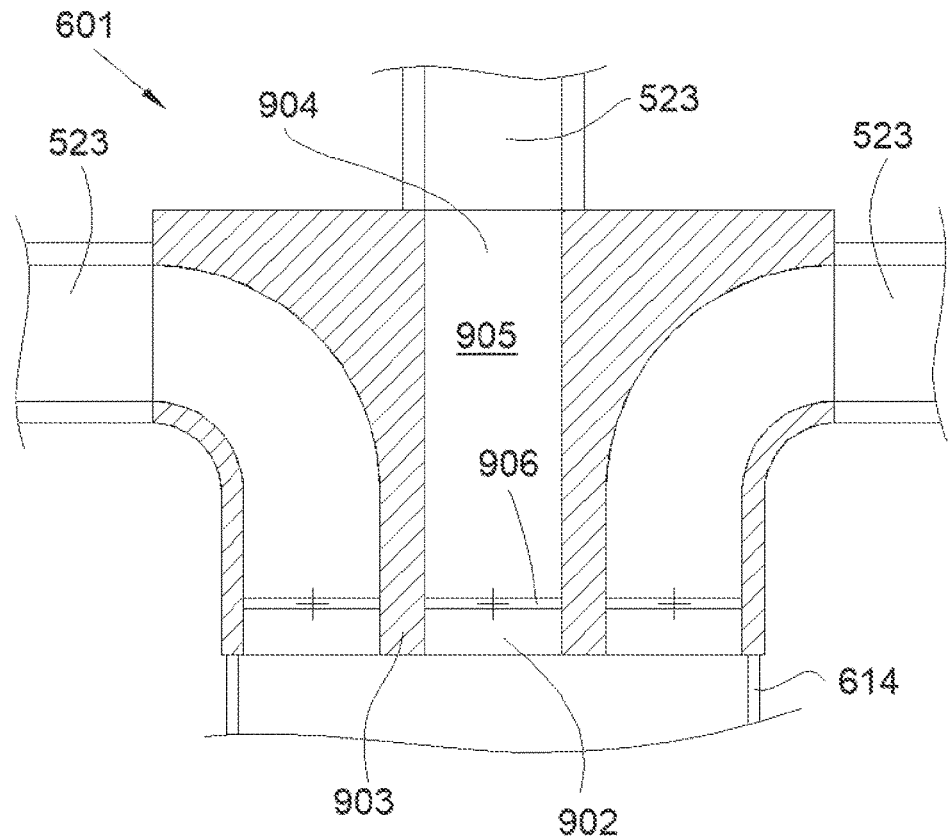
FIG. 9 is a view from above and in cross section of a bypass box of the aeration system according to the invention.
Figure 10:
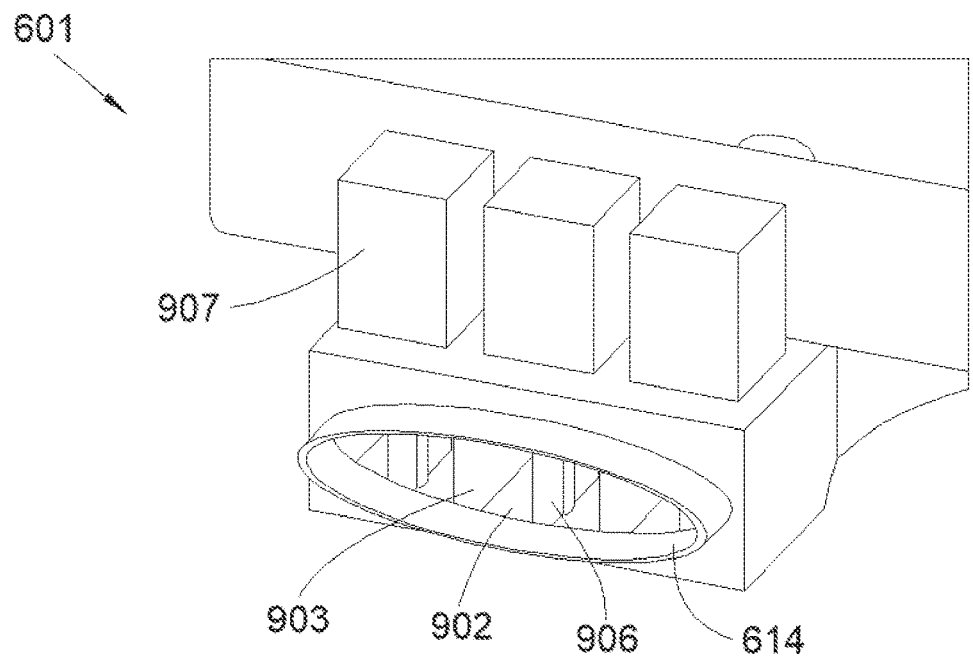
FIG. 10 is a perspective detail view of a bypass box of the aeration system according to the invention.

The bypass box 601 is viewed in cross section in FIG. 9 and in an exterior view in FIG. 10, and has, for each lower gutter 523, an inlet 902 fluidically connected to the supply pipe 614 and an outlet 904 fluidically connected to said lower gutter 523, wherein the inlet 902 and the outlet 904 are fluidically connected to one another by a duct 905. The inlet 902 and the outlet 904 are different for each lower gutter 523 and separated from the neighboring inlet 902 by a wall 903.

Thus, a stream of air entering at an inlet 902 will be diffused at the associated outlet 904, and so as to control the stream of air flowing at each lower gutter 523, the bypass box 601 is equipped at the associated inlet 902 with a door 906 able to move alternately between an open position in which the air is free to circulate between the inlet 902 and the outlet 904 and a closed position in which the air is blocked between the inlet 902 and the outlet 904. In the embodiment of the invention that is presented here, the door 906 is at the inlet 902, but it can be disposed at the outlet 904 and in general terms anywhere between the associated inlet 902 and outlet 904.

For each door 906, the bypass box 601 has a maneuvering system controlled by a control unit 50 depending on the requirements, as explained below. The maneuvering system, such as an electric motor 907, is arranged to move said door 906 alternately from the open position to the closed position.

Each door 906 is in this case a door mounted so as to be able to move in rotation about a vertical shaft that is central with respect to the door 906 and with respect to the inlet 902, and the drive shaft of the associated motor 907 is in this case arranged to drive the shaft of the door 906 in rotation.

In the embodiment of the invention that is presented here, there are three lower gutters 523 per bypass box 601, but this number can vary starting from one, i.e. there is at least one lower gutter 523 per bypass box 601.

The aircraft 100 has a detection assembly that has a plurality of detection means 52, such as for example dihydrogen detectors 619, which are distributed in each embedding channel 200a-b and connected to the control unit 50. Each detection means 52 is arranged to detect the presence of dihydrogen and it is arranged to transmit, to the control unit 50, information regarding whether or not it has detected dihydrogen. On the basis of the information transmitted by each detection means 52 and received by the control unit 50, the latter will control each maneuvering system 907 so as to open or close the associated door 906.

According to one particular mode of operation, in normal operation, i.e. when no dihydrogen leak is detected by the detection assembly, the control unit 50 controls the maneuvering system 907 of each door 906 such that said door 906 is in the open position so as to have similar ventilation towards each lower gutter 523.

According to the same particular mode of operation, when the detection assembly detects a dihydrogen leak at a transport pipe 112a-b, and the aircraft 100 is on the ground, it informs the control unit 50, which controls the maneuvering system 907 of each door 906 corresponding to a lower gutter 523 that is not affected by the leak such that said door 906 is in the closed position, and controls the maneuvering system 907 of each door 906 corresponding to a lower gutter 523 affected by the leak such that said door 906 is in the open position so as to maximize the aeration in said transport pipe 112a-b.

Thus, such an arrangement allows effective management of the stream of air under normal conditions or leak conditions, and in particular rapid dilution of the dihydrogen in the event of a leak.

Above the ducts 905, the bypass box 601 has a recess 603 that is separated from the ducts 905 by a separation floor 605. The recess 603 is in fluidic communication with the upper gutters 521 of the gutters 202 that are connected to said bypass box 601 by their lower gutters 523. This recess 603 is arranged to allow the passage of the transport pipe 112a-b that will be divided in each gutter 202.

In order to ensure ventilation of the recess 603 of the bypass box 601, the separation floor 605 has passing through it at least one hole 607 fluidically connected between at least one of the ducts 905 and the recess 603.

In order to limit the drag in flight, the aeration aperture 610 has a flap 620 that is mounted so as to be able to move relative to the outer skin 630 between a closed position (FIGS. 6 and 7) in which it isolates each window 604 from the external air (arrow 702) and is in the continuation of said outer skin 630 and an open position (FIG. 8) in which it is stowed so as to allow the external air to pass freely towards each window 604 (arrow 802).

Each window 604 is arranged in a bowl 606, and the bowl 606 is closed by the flap 620 or open when the flap 620 opens.

The flap 620 is made to move by a movement system 704 that is controlled by the control unit 50 and arranged to move the flap 620 alternately from the open position to the closed position.

According to one particular mode of operation, in normal operation, i.e. when no dihydrogen leak is detected by the detection assembly and the aircraft 100 is on the ground, the control unit 50 controls the movement system 704 so as to place the flap 620 in the open position so as to ensure a uniform stream of air into the lower gutters 523 of which the doors 906 are all in the open position.

According to the same particular mode of operation, when the detection assembly detects a dihydrogen leak at a transport pipe 112a-b and the aircraft 100 is on the ground, it informs the control unit 50, which controls the movement system 704 so as to place the flap 620 in the open position so as to ensure air enters and the maneuvering system 907 of each door 906 corresponding to a lower gutter 523 that is not affected by the leak such that said door 906 is in the closed position, and controls the maneuvering system 907 of each door 906 corresponding to a lower gutter 523 affected by the leak such that said door 906 is in the open position so as to maximize the aeration in said transport pipe 112a-b.

According to the same particular mode of operation, in normal operation, i.e. when no dihydrogen leak is detected by the detection assembly and the aircraft 100 is in the flight phase, the control unit 50 controls the movement system 704 so as to place the flap 620 in the closed position so as to limit drag and the doors 906 remain in the open position if necessary.

According to the same particular mode of operation, when the detection assembly detects a dihydrogen leak at a transport pipe 112a-b and the aircraft 100 is in the flight phase, it informs the control unit 50, which controls the movement system 704 so as to place the flap 620 in the open position so as to ensure air enters and the maneuvering system 907 of each door 906 corresponding to a lower gutter 523 that is not affected by the leak such that said door 906 is in the closed position, and controls the maneuvering system 907 of each door 906 corresponding to a lower gutter 523 affected by the leak such that said door 906 is in the open position so as to maximize the aeration in said transport pipe 112a-b.

In order to aid the flow of the air in the supply pipes 614, in particular when the aircraft 100 is on the ground, fans 650 are installed in one or more of the supply pipes 614, and these fans 650 are controlled by the control unit 50 so as to increase the air flow rate and thus solve potential problems caused by leaks more quickly.

In the same way, to avoid the appearance of ice, external air is heated by virtue of heating means 652, such as for example a heating resistor, installed in one or more of the supply pipes 614 and controlled by the control unit 50.

In the embodiment of the invention that is presented in FIGS. 7 and 8, with respect to a structure of the aircraft 100, the flap 620 is mounted so as to be able to move in rotation at a front part about a hinge pin 706 that is parallel to the transverse direction Y.

In the closed position, the flap 620 is raised so as to be positioned in front of the windows 604 and shut them off, and in the open position the flap 620 is lowered so as to free up the windows 604.

The movement system 704 is in this case arranged beneath the flap 620 and has a plinth 708 fastened to the structure of the aircraft 100, a slider 710 mounted so as to be able to slide on the plinth 708, in this case parallel to the longitudinal direction X, a connecting rod 712 of which a first end is fastened in an articulated manner to the slider 710 and of which a second end is fastened in an articulated manner to the flap 620, and an actuator 714 controlled by the control unit 50 and arranged to move the slider 710 along the plinth 708.

Depending on the direction of movement of the slider 710, the lever 712 will be raised or lowered, simultaneously driving the flap 620.

The actuator 714 is, for example, a jack.

The slider 710 is guided in translation on the plinth 708 by virtue of known means such as for example a sliding connection of the T-shaped rail and groove type.

In order to prevent the air from no longer arriving at the bypass boxes 601 when one of the supply pipes 614 is shut off, the supply network 612 is constituted of a plurality of supply pipes 614 that merge and separate multiple times so as to create various paths that can be taken by the air.

In the same way, in this case there are five windows 604, in order to prevent the air from not arriving at the bypass boxes 601 if one of the windows is blocked.

According to a particular embodiment, the control unit 50 has, connected by a communication bus: a processor or CPU (central processing unit); a random access memory (RAM); a read-only memory (ROM); a storage unit such as a hard disk or a storage medium reader, such as an SD (secure digital) card reader; at least one communication interface allowing for example the control unit 50 to communicate with the sensors and the motors.

The processor is capable of executing instructions loaded into the RAM from the ROM, from an external memory (not shown), from a storage medium (such as an SD card), or from a communication network. When the equipment is powered up, the processor is capable of reading instructions from the RAM and executing them. These instructions form a computer program that causes the implementation, by the processor, of all or some of the algorithms and steps described here.

All or some of the algorithms and steps described below may be implemented in software form by executing a set of instructions using a programmable machine, for example a DSP (digital signal processor) or a microcontroller, or be implemented in hardware form by a machine or a dedicated component, for example an FPGA (field-programmable gate array) or ASIC (application-specific integrated circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least one transport pipe in which dihydrogen flows,
   for each transport pipe, an embedding channel having a gutter that has a bottom, an opening opposite the bottom, and a perforated intermediate floor between the bottom and the opening that separates the gutter into an upper gutter in which the respective transport pipe is fastened and a lower gutter,
   an aeration system having an aeration aperture having an air inlet arranged to collect air outside the aircraft and at least one supply pipe wherein each supply pipe opens at said air inlet via a window,
   detection means distributed in each embedding channel and arranged to detect a presence of dihydrogen,
   wherein each lower gutter comprises a bypass box having:
   for each of said lower gutters, an inlet fluidically connected to the at least one supply pipe and an outlet fluidically connected to said lower gutter, wherein the inlet and the outlet are fluidically connected to one another by a duct, wherein the inlet is different for each lower gutter,
   between each associated inlet and outlet, a door configured to move alternately between an open position in which the air is free to circulate between the inlet and the outlet and a closed position in which the air is blocked between the inlet and the outlet, and
   for each door, a maneuvering system arranged to move said door alternately from the open position to the closed position, and
   a control unit arranged to receive information from the detection means and control each maneuvering system on a basis of said information.

2. The aircraft according to claim 1, wherein each door is mounted so as to move in rotation about a vertical shaft that is central with respect to the door and with respect to the inlet, and
   wherein the maneuvering system comprises an electric motor having a drive shaft configured to drive the vertical shaft of the door in rotation.

3. The aircraft according to claim 1, wherein the bypass box has a recess separated from the ducts by a separation floor,
   wherein the recess is in fluidic communication with the upper gutter of the gutter connected to said bypass box and wherein the separation floor has, passing through the separation floor, at least one hole fluidically connected between at least one of the ducts and the recess.

4. The aircraft according to claim 1, wherein the aeration aperture has a flap that is mounted so as to move between a closed position in which the flap isolates each window from the external air and an open position in which the flap is stowed so as to allow the external air to pass freely towards each window, and
   said aircraft further comprising:
   a movement system controlled by the control unit and configured to move the flap alternately from the open position to the closed position.

5. The aircraft according to claim 4, wherein the flap is mounted so as to move in rotation at a front part, and
   wherein the movement system has a plinth, a slider mounted so as to slide on the plinth, a connecting rod of which a first end is fastened in an articulated manner to the slider and of which a second end is fastened in an articulated manner to the flap, and an actuator controlled by the control unit and arranged to move the slider along the plinth.

6. The aircraft according to claim 1, wherein fans controlled by the control unit are installed in one or more of the supply pipes.

7. The aircraft according to claim 1, wherein heating means controlled by the control unit are installed in one or more of the supply pipes.

* * * * *